United States Patent [19]
Knott et al.

[11] Patent Number: 5,957,088
[45] Date of Patent: Sep. 28, 1999

[54] POULTRY FLOORING SYSTEM

[75] Inventors: Andrew M. Knott, Whitinsville; John R. Simpson, Webster, both of Mass.

[73] Assignee: Riverdale Mills Corporation, Northbridge, Mass.

[21] Appl. No.: 09/195,977

[22] Filed: Nov. 19, 1998

[51] Int. Cl.$^6$ .................................................. A01K 1/015
[52] U.S. Cl. .......................................... 119/480; 119/528
[58] Field of Search .................................... 119/452, 455, 119/458, 463, 480, 527, 528, 529

[56] References Cited

U.S. PATENT DOCUMENTS

| | | | |
|---|---|---|---|
| 3,721,213 | 3/1973 | Bruggeman | 119/452 |
| 4,046,107 | 9/1977 | Kuster | 119/480 |
| 4,362,128 | 12/1982 | Downey | 119/528 |
| 4,953,501 | 9/1990 | Moreau | 119/528 |
| 5,799,613 | 9/1998 | Greenhaw et al. | 119/452 |
| 5,813,365 | 9/1998 | Helmy | 119/529 |

*Primary Examiner*—Robert P. Swiatek
*Assistant Examiner*—Elizabeth Shaw
*Attorney, Agent, or Firm*—John E. Toupal; Harold G. Jarcho

[57] ABSTRACT

A poultry breeder flooring system including a plurality of spaced apart and substantially parallel wire mesh channel defining beams, a wire mesh floor supported on the channel defining beams and a fastener mechanism interconnecting the floor and the channel defining means. The wire mesh floor and beam assembly provides an improved surface to space ratio which reduces dung collection and thereby enhances egg production.

21 Claims, 3 Drawing Sheets

POULTRY FLOORING SYSTEM

BACKGROUND OF THE INVENTION

This invention relates generally to a wire mesh flooring system and, more specifically to a wire mesh flooring system for use in poultry egg production.

Poultry breeder operations typically utilize flooring systems to support houses for poultry providing egg production. Generally the flooring system is formed by parallel, transversely spaced apart beams consisting, for example, of 2×4 inch boards. Spaces are provided between the beams to allow poultry droppings to fall to the ground below the floor surface for subsequent removal. However, to provide the strength necessary to support the poultry, their houses and personnel periodically monitoring the egg production operations; and to prevent the passage of poultry eggs to the ground below, the spaces between beams must be of limited size. A typical flooring system therefore consists of 2×4 inch board beams spaced apart about one inch and resulting in a floor having a relatively high surface to space ratio. Accordingly, the floor surface retains substantial quantities of poultry dung which provides a source of contamination for deposited eggs and thereby causes substantial reductions in production efficiency and requirements for frequent floor cleaning. Also known are flooring systems in which wire mesh panels are supported by wooden beams. However, again the strength requirements of the flooring system necessitates extensive beam surface area which undesirably accumulates poultry droppings.

The object of this invention, therefore is to provide an improved poultry flooring system which reduces the undesirable accumulation of poultry droppings.

SUMMARY OF THE INVENTION

The invention is a poultry breeder flooring system including a plurality of spaced apart and substantially parallel wire mesh channel defining beams, a wire mesh floor supported on the channel defining beams and a fastener mechanism inter-connecting the floor and the channel defining means. The wire mesh floor and beam assembly provides an improved surface to space ratio which reduces dung collection and thereby enhances egg production.

According to one feature of the invention, the wire mesh floor has interstices dimensioned to prevent the passage of poultry eggs. The relatively fine mesh collects eggs deposited by poultry supported on the floor.

According to another feature of the invention, the wire mesh floor has a gauge of between 14 and 8 and greater than the gauge of each wire mesh beam. These wire mesh gauge characteristics optimize strength requirements and cost of the flooring system.

According to still another feature of the invention, each of the channel defining beams has a U-shaped cross section. The U-shaped beams exhibit sufficient longitudinal strength while minimizing material cost.

According to an important feature, the flooring system includes a plurality of transversely extending strip panels secured between bottom edges of the beams. The strip panels substantially enhance the rigidity of the flooring system.

According to yet another feature of the invention, the flooring system further includes a plurality of wire mesh channel defining legs supporting the channel defining beam and floor assembly. The wire mesh, channel defining legs provide efficient, desired elevation of the floor assembly.

According to further features of the invention, each channel defining leg has an upper portion defining a slot formed by side wall extensions receiving one of the channel defining beams, and engaging the floor.

According to an additional feature of the invention, each channel defining leg has a U-shaped cross section. The U-shaped geometry minimizes cost of the channel defining beams.

The invention also encompasses a method of fabricating a poultry breeder flooring system including the steps of cutting wire mesh material into a plurality of uniformly dimensioned beam panels; bending each beam panel into a channel defining beam; arranging the beams in a spaced apart, substantially parallel array; and securing wire mesh flooring material on the array to provide a floor assembly. This method efficiently provides an effective floor assembly for poultry breeding facilities.

According to one feature, the method includes the steps of cutting wire mesh material into a plurality of uniformly dimensioned leg panels; bending each leg panel into a channel defining leg; and securing upper ends of the legs to substantially spaced apart portions of the floor assembly. The channel defining legs provide desired elevation of the floor assembly.

According to another feature, the method includes the steps of forming a plurality of wire mesh strip panels and securing the strip panels to bottom edges of transversely spaced apart beams. The strip panels desirably increase the rigidity of the flooring system.

DESCRIPTION OF THE DRAWINGS

These and other objects and features of the invention will become more apparent upon a perusal of the following description taken in conjunction with the accompanying drawings wherein:

FIG. 3 is a partial detailed view of a beam member of the system shown in FIG. 1;

FIG. 4 is a detailed partial perspective view of a leg member of the system shown in FIG. 1;

DESCRIPTION OF THE PREFERRED EMBODIMENTS

Figure 2:
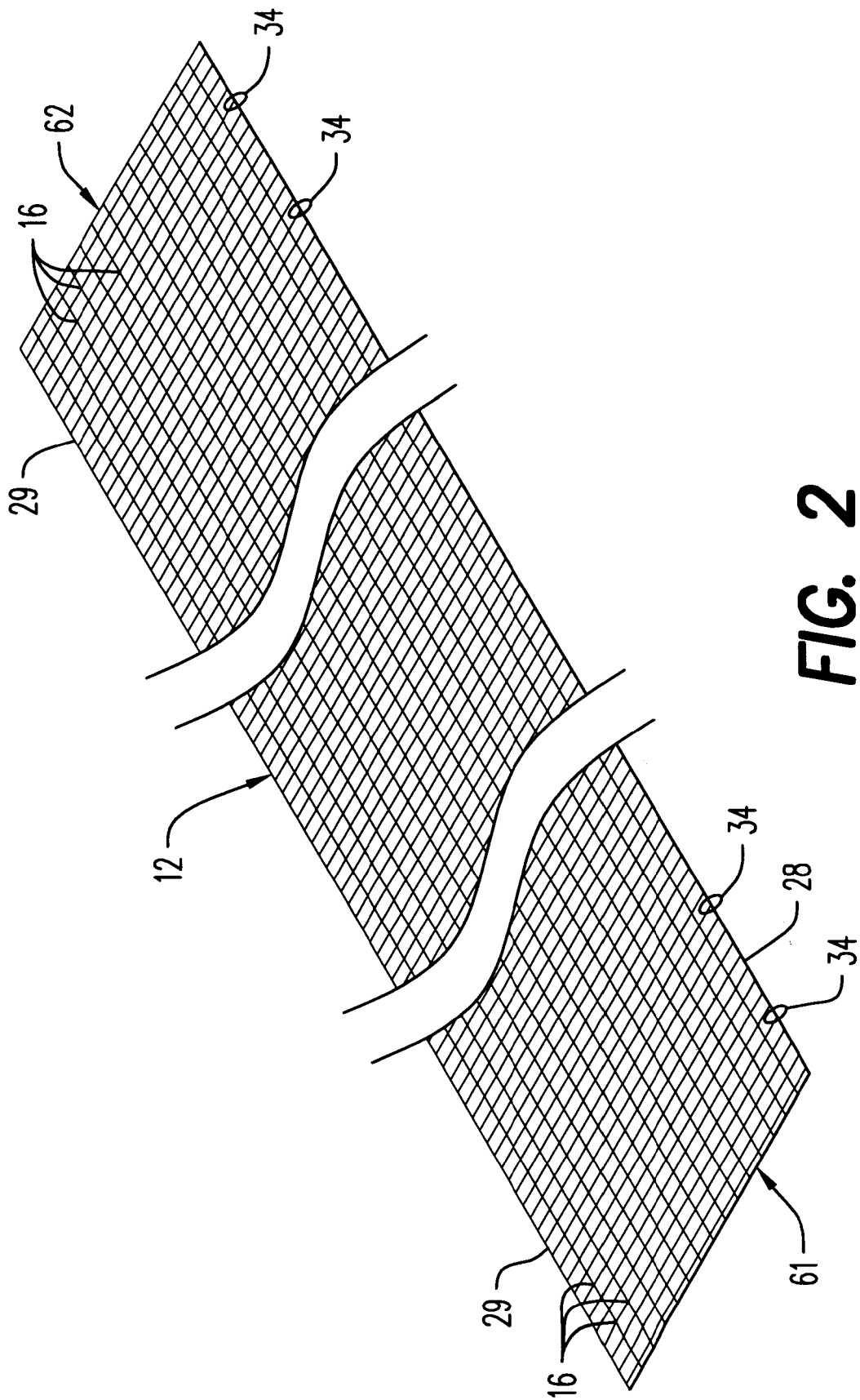
FIG. 2 is a partial detailed view of a floor member of the system shown in FIG. 1.

A poultry flooring system 11 includes a wire mesh floor 12 supported by a plurality of transversely spaced apart, parallel beams 13 and a plurality of spaced apart legs 14. As shown in FIG. 2, the wire mesh floor 12 has rectangular interstices 16 dimensioned to prevent passage of typical poultry eggs. Preferably, the floor 12 is formed from welded wire having a gauge of between 14 and 8 and with rectangular interstices 16 having, for example, a width of 0.75 inches and a length of 3.0 inches.

Figure 1:
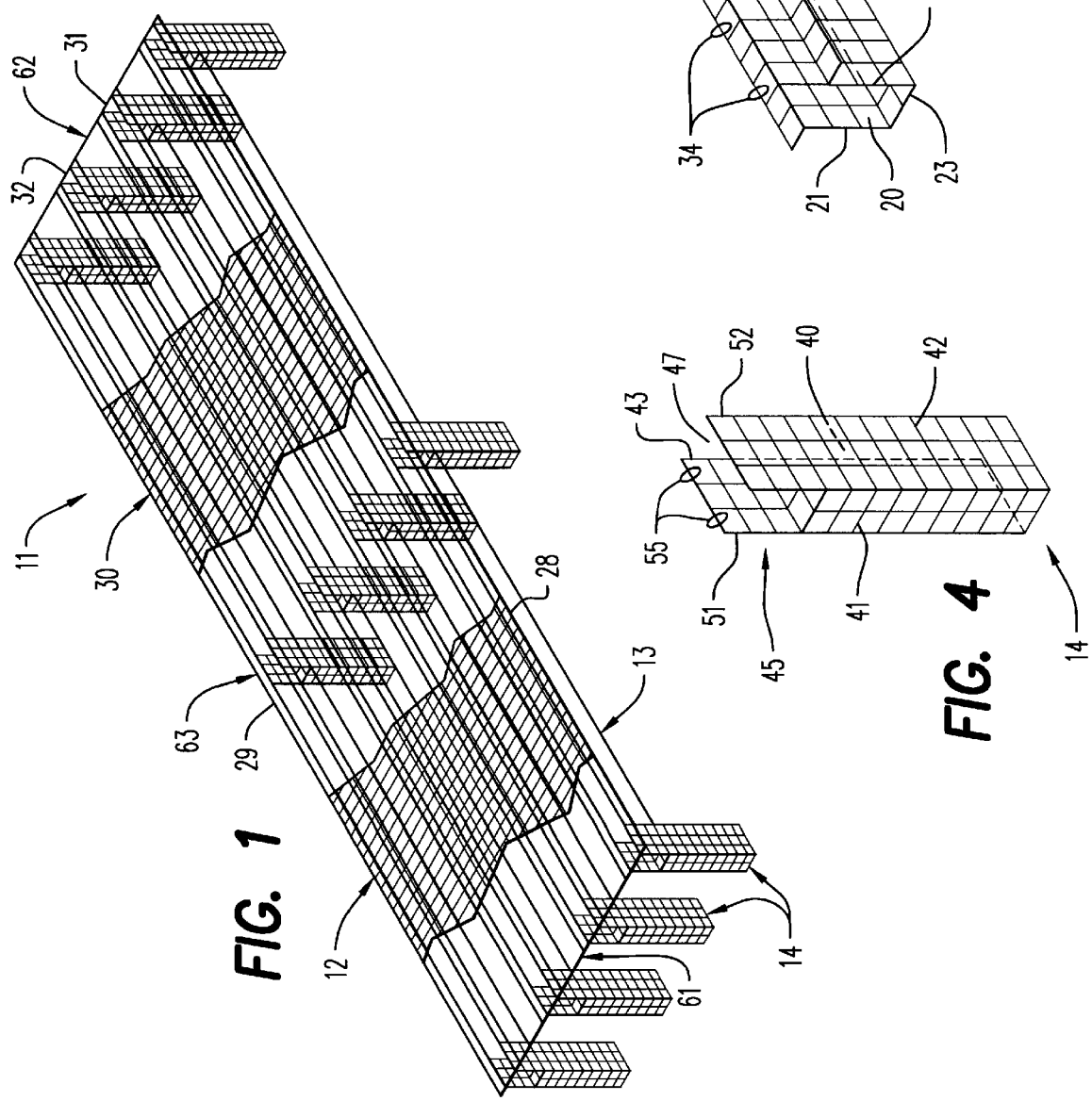
FIG. 1 is a perspective view of a poultry flooring system according to the invention.

Each of the beams 13 (FIG. 3) is formed of wire mesh providing a channel 20 of U-shaped cross section and defined by parallel sidewalls 21, 22, projecting vertically upwardly from a bottom wall 23 to an upwardly facing opening 24. Straddling the opening 24 are transversely projecting flange portions 26, 27. As shown in FIG. 1 a beam 13 is disposed under each longitudinal edge 28, 29 of the floor 12 and under transversely spaced apart longitudinally extending mid-portions 31, 32 thereof. Securing the beams 13 to the floor 12 are fastener clips 34 (FIGS. 2 and 3) secured around adjacent wires of the floor 12 and flange portions 26, 27 of each support beam 13. To optimize strength and material costs of the beam and floor assembly 30, the beams 13 preferably are formed of a welded wire mesh material having a lower gauge than the mesh material utilized for the floor 12.

As shown in FIG. 4, each of the legs 14 is formed with a U-shaped cross section to define a channel 40 having an end wall 41 joined to side walls 42, 43. An upper portion 45 of each leg 14 has a section of the end wall 42 removed to provide a slot 47 formed by extensions 51, 52 of the side walls 42, 43. Each of the slots 47 retains an aligned portion of one of the beams 13. Securing the upper portions 45 of the legs 14 to the beam and floor assembly 30 are clips 55 (FIGS. 2 and 4) which are secured around adjacent wires of the floor 12 and extensions 51, 52. As shown in FIG. 1, the legs are distributed under longitudinal ends 61, 62 of the floor assembly 30 and under a mid-portion 63 thereof.

A preferred method of fabricating the flooring system 11 entails cutting wire mesh material into a plurality of uniformly dimensioned beam panels and forming each of the panels into one of the channel defining beams 13. Next, the beams 13 are arranged in a spaced apart, parallel array as shown in FIG. 1 and the floor 12 is secured to the flange portions 26, 27 of the beams 13 with the fastening clips 34. Next, the legs 14 are mounted to support the floor and beam assembly 30 with the leg slots 47 receiving the beams 13 and the shoulder portions 51, 52 on the upper portions 45 of the legs 14 secured to the floor 12 with the clips 55. The legs 14 are fabricated by first cutting suitable wire mesh material into a plurality of uniformly dimensioned leg panels and then forming each leg panel into one of the U-shaped, channel defining legs 14.

In a preferred embodiment of the flooring system 11, the floor 12 is formed from welded wire mesh with a length of 14 feet and a width of 4 feet, a gauge of 12.5 and rectangularly shaped interstices 76 with a width of 0.75 inches and a length of 3 inches. The beams 13 are formed from welded wire mesh having a gauge of 10.5 and 1.5 inch square interstices. A conventional wire bending brake is used to form each beam panel into a channel defining beam having a bottom wall (23) 3 inches in width, side walls (21, 22) 4½ inches in height and flange portions (26, 27) 1.5 inches in width. The legs 14 are formed of welded 12.5 gauge wire mesh having rectangularly shaped interstices of 3 inch width and 4.5 inch length. Each leg panel is formed by a bending brake to provide a slot 47 with a 4.5 inch depth and with an end wall 41 of 6 inch width, side walls 42, 43 of 9 inch width and 18 inch height and shoulder portions 51, 55 of 9 inch width and 4.5 inch of transversely projecting length.

Figure 6:
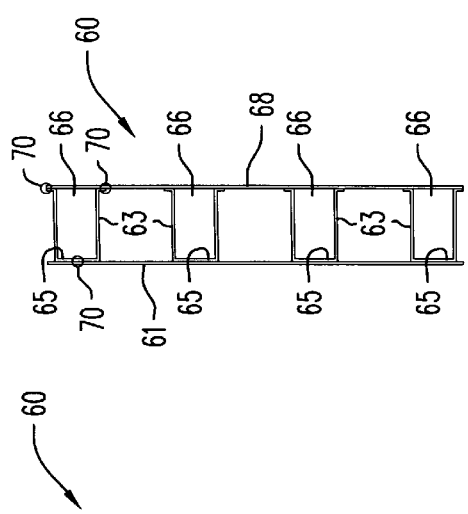
FIG. 6 is an end view of the system shown in FIG. 5.
Figure 5:
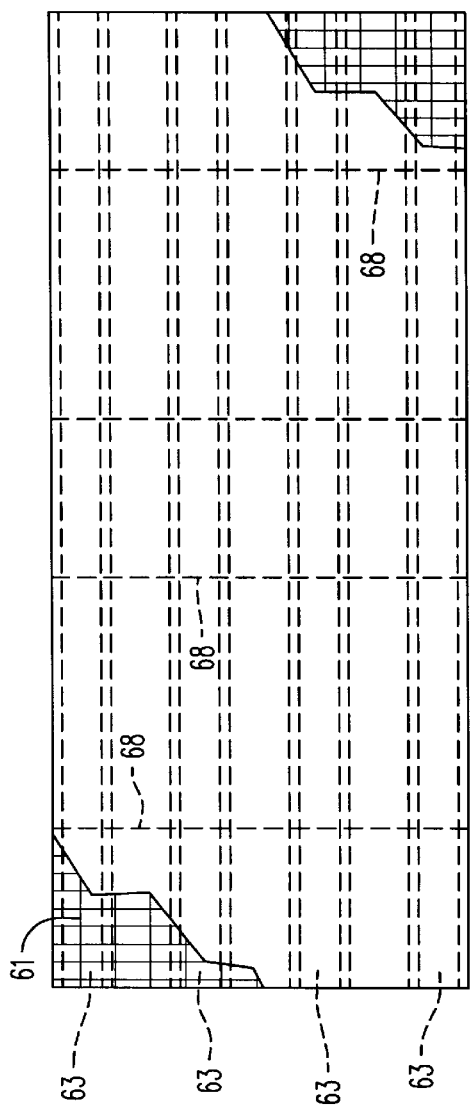
FIG. 5 is a top view of another flooring system embodiment of the invention.
Figure 7:
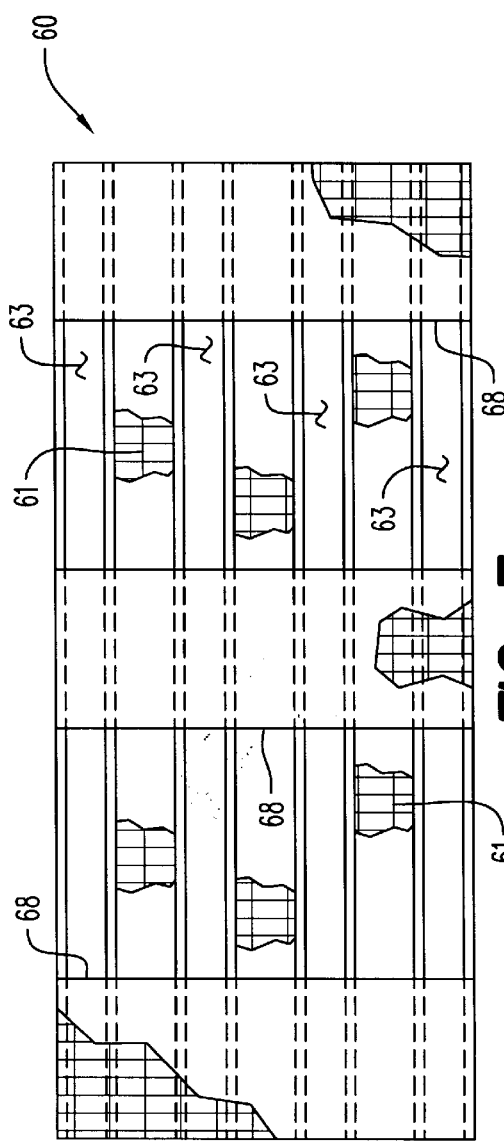
FIG. 7 is a bottom view of the system shown in FIGS. 5 and 6.

Illustrated in FIGS. 5–7 is another floor assembly embodiment 60 having a wire mesh floor 61 mounted on a plurality of transversely spaced apart, parallel beams 63. Each beam 63 has a U-shaped cross section and defines an upwardly facing, longitudinally extending closed upper edge wall 65 and a downwardly facing, longitudinally extending open bottom edge 66. Secured to the bottom edges 66 of adjacent beams 63 are a plurality of longitudinally spaced apart, wire mesh strip panels 68. Preferably, the strip panels 68 are disposed under opposite ends of the assembly 60 and under a mid-portion thereof. The strip panels 68 increase longitudinal stability of the beams 63 to enhance rigidity and structural integrity of the assembly 60. The beams 63 are secured to the floor 61 and the strip panels 68 with suitable clips 70 as described above. Also the floor assembly 60 can be supported by various structures such as the wire mesh legs 14 used in the embodiment 11 shown in FIGS. 1–4.

Obviously, many modifications and variations of the present invention are possible in light of the above teachings. It is to be understood, therefore, that the invention can be practiced otherwise than as specifically described.

What is claimed is:

1. Poultry breeder flooring system comprising:
   a plurality of spaced apart and substantially parallel wire mesh channel defining beams having upper and lower edges;
   a wire mesh floor supported on said upper edges of said channel defining beams; and
   fastener means interconnecting said floor and said channel defining beams.

2. A flooring system according to claim 1 wherein said wire mesh floor has interstices dimensioned to prevent the passage of poultry eggs.

3. A flooring system according to claim 2 wherein said wire mesh floor has a gauge of between 14 and 8.

4. A flooring system according to claim 2 including a plurality of spaced apart wire mesh panels extending transversely to said beams and secured to said lower edges thereof.

5. A flooring system according to claim 2 wherein each of said channel defining beams has a U-shaped cross section.

6. A flooring system according to claim 5 wherein each of said beams has a downwardly facing, longitudinally extending opening defining said lower edge.

7. A flooring system according to claim 6 including a plurality of spaced apart wire mesh panels extending transversely to said beams and secured to said lower edges thereof.

8. A flooring system according to claim 5 wherein each of said beams has an upwardly facing, longitudinally extending opening straddled by transversely projecting flange portions engaging said floor.

9. A flooring system according to claim 2 wherein each said wire mesh beam has a gauge lower than the gauge of said wire mesh floor.

10. A flooring system according to claim 2 wherein said flooring system further comprises a plurality of wire mesh channel defining legs supporting said channel defining beams and said floor.

11. A flooring system according to claim 10 wherein each said channel defining leg has an upper portion defining a slot receiving one of said channel defining beams.

12. A flooring system according to claim 11 wherein each said upper portion has a pair of side wall extensions defining said slot and engaging said floor.

13. A flooring system according to claim 10 wherein each said channel defining leg has a U-shaped cross section.

14. A method of fabricating a poultry breeder flooring system comprising the steps of:
   (a) cutting wire mesh material into a plurality of uniformly dimensioned beam panels;
   (b) bending each said beam panel into a channel defining beam;
   (c) arranging said beams in a spaced apart, substantially parallel array; and
   (d) securing wire mesh flooring material on said array to provide a floor assembly.

15. A method according to claim 14 wherein said steps (a) and (b) comprise forming each said beam into a U-shaped cross section having an upwardly facing, longitudinally extending opening straddled by transversely projecting flange portions; and said step (d) comprises securing said flooring material to said flange portions.

16. A method according to claim 14 including the further step of cutting wire mesh material into a plurality of strip panels; and securing said strip panels between bottom edges of said beams.

17. A method according to claim 14 wherein said strips (a) and (b) comprise forming each said beam into a U-shaped cross section having a downwardly facing, longitudinally extending opening forming a bottom edge and an upwardly facing, longitudinally extending closed upper edge; and said step (d) comprises securing said flooring material to said upper edge.

18. A method according to claim 17 including the further step of cutting wire mesh material into a plurality of strip panels; and securing said strip panels between said bottom edges of said beams.

19. A method according to claim 14 comprising the further steps of:
   (a) cutting wire mesh material into a plurality of uniformly dimensioned leg panels;
   (b) bending each said leg panel into a channel defining beam; and
   (c) securing upper ends of said leg panels to substantially spaced apart portions of said floor assembly.

20. A method according to claim 14 wherein each said wire mesh beam has a gauge lower than the gauge of said wire mesh floor.

21. A method according to claim 14 wherein said wire mesh floor has interstices dimensioned to prevent the passage of poultry eggs.

* * * * *